(12) United States Patent
Trinkel

(10) Patent No.: US 8,215,456 B2
(45) Date of Patent: Jul. 10, 2012

(54) AUXILIARY LUBRICATION UNIT FOR LUBRICANT INTRODUCTION DEVICES

(75) Inventor: Ralf Trinkel, Gerolsheim (DE)

(73) Assignee: Lincoln GmbH, Walldorf (DE)

( * ) Notice: Subject to any disclaimer, the term of this patent is extended or adjusted under 35 U.S.C. 154(b) by 820 days.

(21) Appl. No.: 11/994,914

(22) PCT Filed: Apr. 7, 2006

(86) PCT No.: PCT/EP2006/003183
§ 371 (c)(1),
(2), (4) Date: Jan. 14, 2009

(87) PCT Pub. No.: WO2007/006354
PCT Pub. Date: Jan. 18, 2007

(65) Prior Publication Data
US 2009/0288916 A1      Nov. 26, 2009

(30) Foreign Application Priority Data
Jul. 7, 2005   (DE) ............. 20 2005 010 673 U

(51) Int. Cl.
*F16N 11/04*       (2006.01)
(52) U.S. Cl. ....................................... 184/45.1
(58) Field of Classification Search ........... 184/6.14, 184/6.26, 7.4, 45.1
See application file for complete search history.

(56) References Cited

U.S. PATENT DOCUMENTS

| | | | | |
|---|---|---|---|---|
| 1,891,544 A * | 12/1932 | Kerns | ............. | 184/7.2 |
| 2,126,451 A * | 8/1938 | Creveling | ............. | 184/7.4 |
| 2,483,544 A * | 10/1949 | Oystein | ............. | 184/45.1 |
| 4,114,560 A | 9/1978 | Wegmann | | |
| 4,397,376 A | 8/1983 | Saretzky | | |
| 4,572,331 A * | 2/1986 | Powell et al. | ............. | 184/7.4 |
| 5,147,016 A | 9/1992 | Antila | | |
| 5,584,361 A * | 12/1996 | Cisko et al. | ............. | 184/7.4 |
| 5,749,439 A * | 5/1998 | Van Maanen | ............. | 184/6.12 |
| 6,260,664 B1 * | 7/2001 | Fieffer | ............. | 184/7.4 |

FOREIGN PATENT DOCUMENTS

| | | |
|---|---|---|
| GB | 30019 | 0/1911 |
| JP | 59040095 | 3/1984 |

OTHER PUBLICATIONS

International Search Report regarding PCT/EP2006/003183 with English translation, 13 pages.

* cited by examiner

*Primary Examiner* — William A Rivera
*Assistant Examiner* — Robert T Reese
(74) *Attorney, Agent, or Firm* — Senniger Powers LLP

(57) ABSTRACT

The invention relates to an auxiliary lubrication unit for lubricant introduction devices. The unit comprises a base body (2), in whose longitudinal bore (10) a control piston (6) is displaced axially by a spring (4) towards a seal (9) and also comprises lateral connections (1a, 1p) of a chamber (11) that is delimited by the control piston (6) in the longitudinal bore (10). The connections run from a lubricant pump and to an installation that is to be supplied with lubricant and allowing lubricant to be transported, in the sealing position of the control piston (6), through the chamber (11) from the lubricant pump to the installation. If the pump fails, the control piston (6) can be displaced by remains of auxiliary lubricant from its sealing position, in opposition to the action of the spring (4), into a position in which the connection (1a) to the installation is open and the connection (1p) to the lubricant pump is closed, enabling the installation to the filled with the auxiliary lubricant.

15 Claims, 1 Drawing Sheet

Key:  A   To installation
      B   From pump

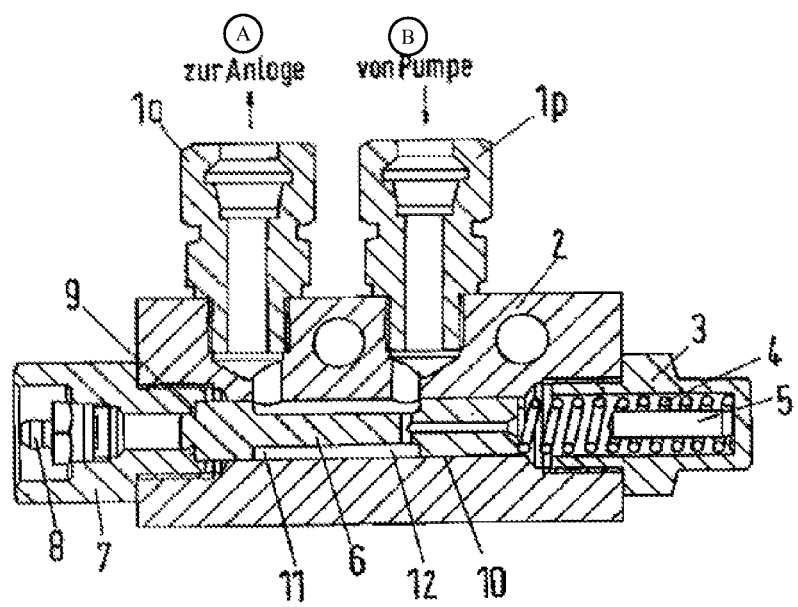
Key: A    To installation
     B    From pump

AUXILIARY LUBRICATION UNIT FOR LUBRICANT INTRODUCTION DEVICES

The invention relates to an auxiliary lubrication unit for lubricant introduction devices.

Such units are needed when an installation is to be filled with lubricant by hand if, e.g., a pump in a lubricant introduction device fails. Such a lubrication unit should be simple in construction and should provide reliable continuous operation.

These requirements are fulfilled by an auxiliary lubrication unit according to the invention, which has a body, in whose longitudinal borehole a control piston is pressed by a spring so that it can move axially in the direction of a seal, with lateral connections of a chamber held open by the control piston in the longitudinal borehole from a lubricant pump and to the installation to be supplied with lubricant, so that in the sealed position of the control piston, lubricant can be fed through the chamber from the lubricant pump to the installation. If the pump fails, the control piston can be moved out of its sealed position against the effect of the spring by means of auxiliary lubricant into a position in which the connection to the installation is opened and the connection to the lubricant pump is closed, so that the installation can be filled by means of the auxiliary lubricant.

Advantageously, the control piston has a relief borehole for the return of lubricant from the chamber to the lubricant pump when the control piston is pressurized with auxiliary lubricant.

The spring is advantageously held as a helical spring in a screw plug of the longitudinal borehole.

Here, a stop pin for the control piston can be provided in the screw plug in order to prevent falling below the spring block length.

In another construction of the concept of the invention, in one end (the end opposite the screw plug) of the longitudinal borehole there is a filling screw with a lubricating nipple without a non-return valve. The lubricating nipple is used for feeding the auxiliary lubricant and allows a small amount of control lubricant to escape, so that the control piston can be pressed back into its sealed position in the direction of the lubricating nipple when the feeding of the auxiliary lubricant feed is complete.

The seal advantageously contacts the filling screw, so that a reliable thrust bearing for the spring-biased control piston is provided.

For the sake of simplicity, the connections from the lubricant pump and to the installation can each be formed with straight, threaded pipe connections.

Additional goals, features, advantages, and possible applications of the invention emerge from the following description of embodiments with reference to the drawing. Here, all of the described and/or illustrated features by themselves or in any combination form the subject matter of the invention, also independently of their combination in individual claims and their related claims.

The sole FIGURE shows an auxiliary lubrication unit featuring the invention in longitudinal section.

In the illustrated auxiliary lubrication unit, in a body 2 there is a longitudinal borehole 10, within which a control piston 6 is supported so that it can move axially. In the automatic operation of the lubricant introduction device, the control piston 6 is pressed by a spring 4 against a seal 9, which is formed as a ring and which contacts the inner end of a filling connection comprising a filling screw 7 screwed into one end of the borehole 10. The spring 4 is held in a screw plug 3 on the end of the borehole 10 opposite the filling screw 7. A cylindrical stop pin 5 is located in the screw plug 3 in order to prevent falling below the spring block length. In the filling screw 7, a lubricating nipple 8 is screwed in without a non-return valve. A connection 1p from the lubricant pump opens into the chamber 11. A connection 1a leads away from the chamber 11 to the installation to be supplied with lubricant. The connections 1a, 1p are each formed as straight, threaded pipe connections. During automatic operation, the control piston 6 is located in its left sealed position, and lubricant can flow unimpaired from the pump line into the installation line due to the chamber 11. The control piston 6 is held in this position during automatic operation by the force of the spring 4. When pressure is applied from the pump direction, the control piston 6 is also pressed by system pressure against the seal 9.

If, for example, the pump fails, it must be brought to the relief position. Thus, the pump line is open. Now, with a hand lever lubricant press, e.g., auxiliary lubricant can be pressed into the body 2 at the lubricating nipple 8. The control piston 6 moves to the right against the force of the spring 4. The lubricant in the chamber 11 can escape via a relief borehole 12 in the control piston 6 to the lubricant pump. The control piston 6 moves far enough until the line to the installation is opened and the line to the lubricant pump is closed. In this position, the installation can be filled with auxiliary lubricant. When the installation has been completely filled, only the lubrication head of the hand lever press must be removed from the lubricating nipple 8. A small amount of lubricant (amount of control lubricant) will escape through the lubricating nipple 8 without a non-return valve, so that the control piston 6 can be pressed by the force of the spring 4 back in the direction of the lubricating nipple 8. The control piston 6 is then located back in the home position and closes the inlet on the lubricating nipple 8 through the installed seal 9. In this sealed position, either an automatic or a manual lubrication cycle can be performed.

For setting the auxiliary lubrication unit in operation, it is only necessary to set the lubricant pump to the relief position. For a manual lubrication cycle, no tools are required. Incorrect operation is ruled out because, when deactivated, the device is automatically positioned in its home position, where the control piston 6 is pressed into the sealed position against the seal 9 by the spring 4.

LIST OF REFERENCE SYMBOLS

1a, 1p Connections
2 Body
3 Screw plug
4 Spring
5 Stop pin
6 Control piston
7 Filling screw
8 Lubricating nipple
9 Seal
10 Longitudinal borehole
11 Chamber
12 Reduced-diameter portion of control piston

The invention claimed is:

1. Auxiliary lubrication unit for lubricant introduction devices, said unit comprising a body having a longitudinal borehole in which a control piston is urged by a spring so that it can move axially in the direction of a seal, and lateral connections of a chamber held open by the control piston in the longitudinal borehole from a lubricant pump and to an installation to be supplied with lubricant, so that in the sealed position of the control piston lubricant can be fed through the chamber from the lubricant pump to the installation, wherein, if the pump fails, the control piston can be moved by means of auxiliary lubricant not supplied from the pump out of its sealed position against the urging of the spring into an auxiliary filling position in which the connection to the installation is open via the longitudinal borehole and the connection to the lubricant pump is closed, so that the installation can be filled with auxiliary lubricant.

2. Auxiliary lubrication unit according to claim 1, characterized in that the control piston has a reduced diameter portion defining said chamber for the lubricant return from the chamber to the lubricant pump when the control piston is displaced against the force of the spring.

3. Auxiliary lubrication unit according to claim 1 or 2, wherein the spring is held in a screw plug of the longitudinal borehole.

4. Auxiliary lubrication unit according to claim 3, further comprising a stop pin in the screw plug for the control piston.

5. Auxiliary lubrication unit according to claim 3, further comprising a filling screw in one end of the borehole, said filling screw comprising a lubricating nipple through which said auxiliary lubricant can be supplied.

6. Auxiliary lubrication unit according to claim 5, wherein the seal contacts the filling screw.

7. Auxiliary lubrication unit according to claim 6, wherein the connections are formed with straight, threaded pipe connections.

8. Auxiliary lubrication unit according to claim 1, further comprising a filling screw in one end of the borehole, said filling screw comprising a lubricating nipple through which said auxiliary lubricant can be supplied.

9. Auxiliary lubrication unit according to claim 1, wherein the connections are formed with straight, threaded pipe connections.

10. Auxiliary lubrication unit according to claim 1, wherein the chamber is located between the spring and the seal.

11. Auxiliary lubrication unit according to claim 1, further comprising a filling screw by which, if the pump fails, auxiliary lubricant can be delivered via the longitudinal borehole to the connection to the installation while the connection from the pump is closed.

12. An auxiliary lubrication unit for lubricant introduction devices, said unit comprising
  a body having a longitudinal borehole,
  a control piston movable in the borehole,
  a chamber in the borehole defined by the piston,
  a pump connection on the body for connecting a lubricant supply pump to the chamber,
  an installation connection on the body for connecting the chamber to an installation,
  a filling connection on the body for receiving auxiliary lubricant not supplied from the lubricant supply pump,
  a spring urging the control piston toward a sealed position in which the pump and installation connections are open to the chamber to enable lubricant to flow from the pump to the installation, and in which the filling screw is sealed from the pump and installation connections, and
  wherein, if the pump fails, auxiliary lubricant delivered through the filling screw moves the control piston out of said sealed position to an auxiliary filling position in which the pump connection is closed and the installation connection is open for flow of the auxiliary lubricant from the filling connection to the installation.

13. An auxiliary lubrication unit according to claim 12, wherein said filling connection comprises a filling screw with a lubricating nipple.

14. An auxiliary lubrication unit according to claim 12, wherein the filling connection is adjacent one end of the borehole and the spring is adjacent an opposite end of the borehole.

15. An auxiliary lubrication unit according to claim 12, further comprising a seal in the borehole located between the filling connection and the control piston, said spring urging the control piston toward said sealed position in which the control piston engages the seal.

* * * * *